April 22, 1930.  W. LE R. BRYANT  1,755,238
WHEELHEAD AND THE LIKE
Filed Nov. 9, 1926  2 Sheets-Sheet 1

Inventor
William L. Bryant

April 22, 1930.  W. LE R. BRYANT  1,755,238
WHEELHEAD AND THE LIKE
Filed Nov. 9, 1926  2 Sheets-Sheet 2
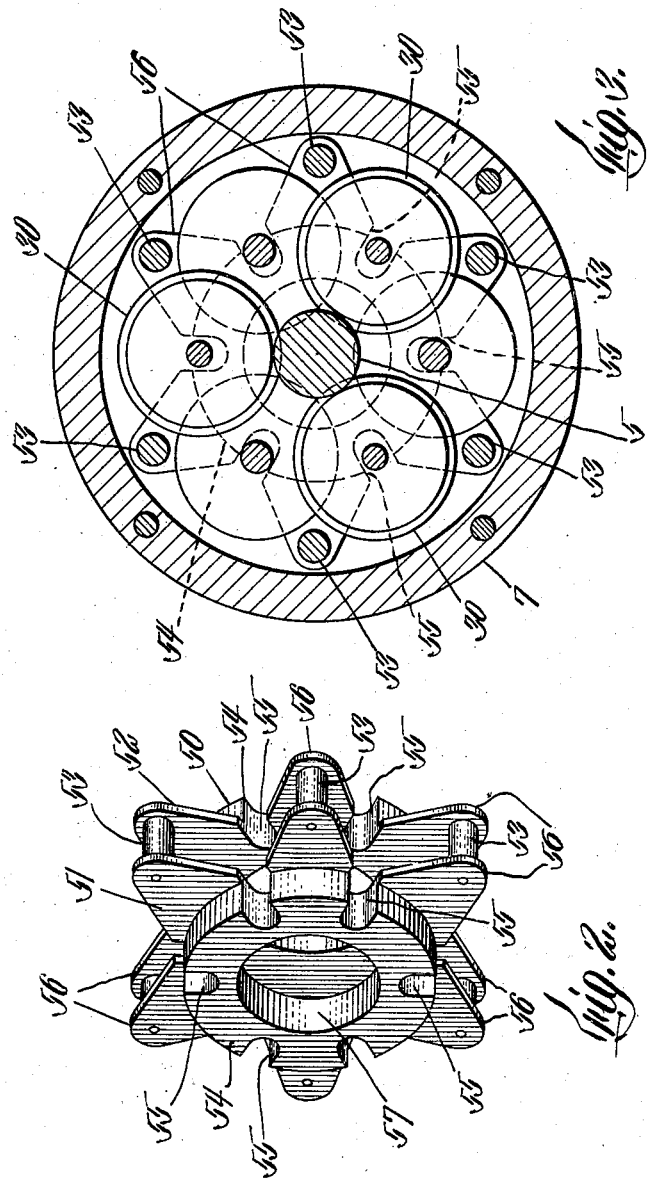

Patented Apr. 22, 1930

1,755,238

UNITED STATES PATENT OFFICE

WILLIAM LE ROY BRYANT, OF SPRINGFIELD, VERMONT

WHEEL HEAD AND THE LIKE

Application filed November 9, 1926. Serial No. 147,341.

This invention relates to bearings for high speed shafts such as wheelheads for grinding machines and has for its object to provide such a bearing which will be of materially longer life than those heretofore constructed and capable of being driven at higher speeds.

In my application for patent, Serial No. 147,340 filed November 9, 1926, for wheelheads and the like, is disclosed and claimed a bearing construction in which a shaft is supported on large diameter portions of rollers, these rollers being journaled on small diameter portions which, in the construction shown, turn in fixed bearings. By causing the large diameter portions to be larger than the shaft diameter, the angular velocity of the rollers is always less than that of the shaft, and the surface speed of the small bearings is further reduced because of their small diameter as compared to the large diameter portions of the rollers which bear on the shaft.

According to the present invention the advantages incident to the use of rollers having large diameter shaft supporting, and small diameter bearing portions is retained, and roller velocity and friction are further reduced by causing the bearing portions of the rollers to have rolling rather than sliding contact with their supporting surfaces. Means for taking end thrust on the shaft and for adjusting for wear both endwise and radially of the shaft may also be provided.

For a more complete understanding of this invention reference may be had to the accompanying drawings in which:

Figure 2 is a perspective of the roller carrying cage.

Figure 3 is a cross section on line 3—3 of Figure 1.

Figure 1:
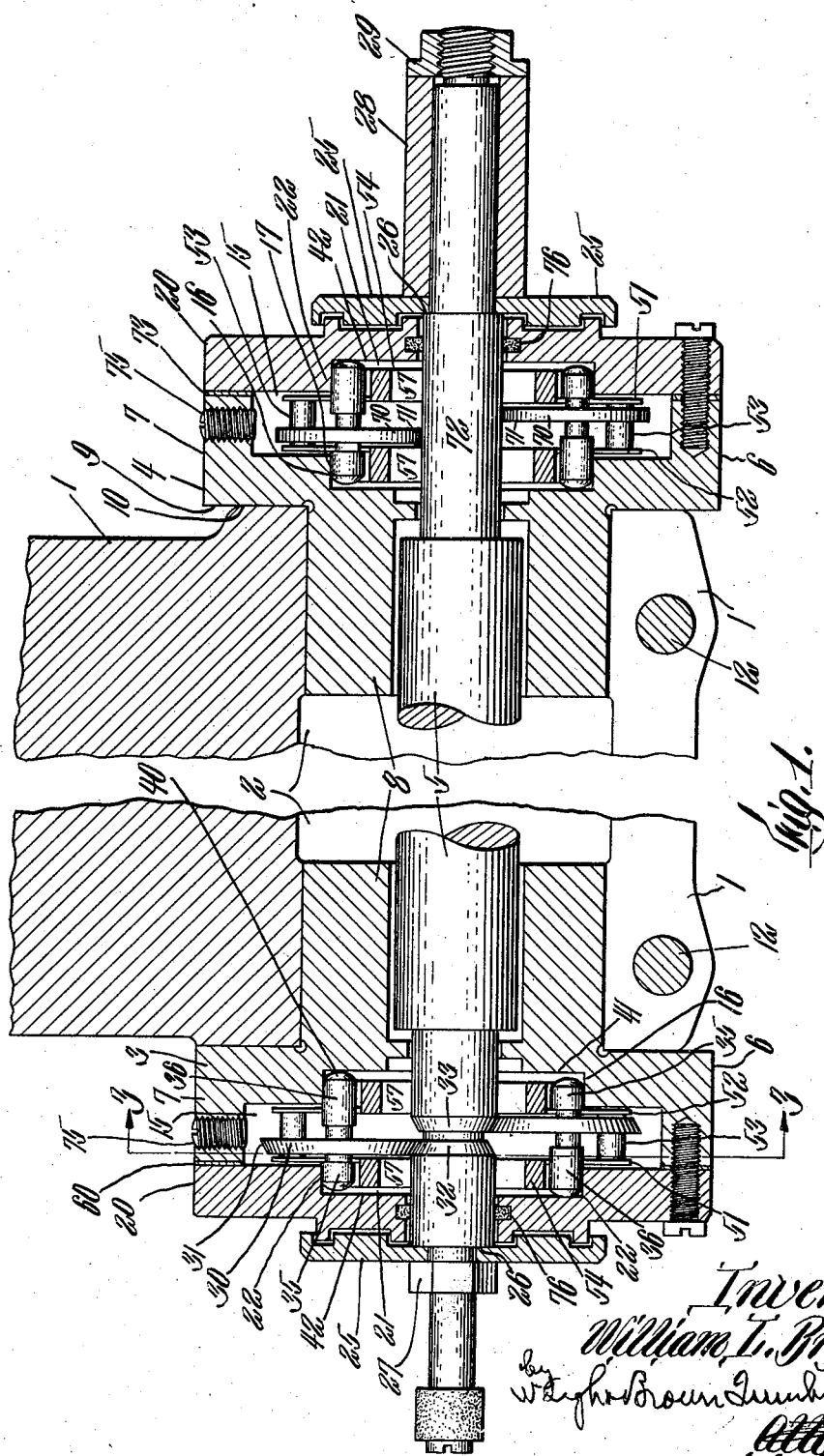
Figure 1 is a longitudinal section through a wheelhead showing an embodiment of this invention.

At 1 in Figure 1 is indicated a machine frame having an opening 2 extending therethrough. In opposite ends of this opening are positioned bearings 3 and 4 for rotatably supporting the shaft or wheel spindle 5. Each of the bearings 3 and 4 comprises a two-part casing 6, one of these parts as 7 having a hub portion 8 extending within the opening 2 and shoulder 9 on each casing outwardly of the hub abutting against one of the end faces 10 of the frame. These bearing members may be fixed in position in any suitable manner, as for example by means of clamping bolts 12 passing through parts of the machine frame 1. Each of the members 7 is shaped to form an annular socket portion 15 and an extension 16 of smaller diameter arranged concentrically with the portion 15. This extension 16 is provided with an internal annular bearing wall 17 for a purpose which will later appear. The outer face of the socket portion 15 is normally closed off by cover plate 20, which forms the other part of the bearing casing. This cover member has a recess 21 formed therein, this recess having an internal annular wall portion 22 preferably in substantial alinement with the wall portion 16 throughout its entire circumference. These wall portions 16 and 22 act as tracks on which move bearing portions of shaft supporting rollers, as will later appear.

The shaft 5 extends axially through the bearings and is concentrically related to the wall portions 16 and 22.

Since in the embodiment shown the bearing is intended to support a grinding wheel spindle, means are preferably provided for preventing the entrance of abrading particles into the bearings. For this purpose an annular guard 25 is shown as fixed against a shoulder 26 at each end of the shaft, a nut or shoulder portion 27 bearing on one of these cover plates 25. A sleeve 28, which may also be used as a driving pulley for a belt and the outer end of which is engaged by a nut 29 threaded on the opposite end of the shaft 5 is shown as holding the opposite guard plate 25 in position. The outer face of each of the cover plates 20, and the corresponding guard plate 25 are preferably formed with concentrically arranged annular elevations and depressions in order to form a tortuous passage from the periphery of each of the guard plates to the shaft adjacent to the bearing.

The bearing rollers are preferably somewhat different at the ends of the shaft and consequently the construction shown at the left hand end of the Figure 1 in bearing 3 will be first described. Each of the rollers therein shown comprises a large diameter portion 30 having a bevelled or tapered periphery as at 31 which engages a mating bevelled surface 32 or 33 of the shaft or spindle 5. Each of these rollers has a pair of bearing portions 35 and 36 of relatively small diameter and concentrically arranged with reference to the large diameter portions. As shown in Figure 1 the bearing portion 35 is of relatively short length, while the bearing portion 36 is much longer. The rollers are arranged in two circular series about the shaft 5. In one of these series, as shown in the upper part of Figure 1, the short bearing portions 35 are arranged to bear against the wall 22, and the bearing portions 36 against the wall 16, and in the other, as shown in the lower part of Figure 1, the rollers are reversed end for end, their bearing portions 35 engaging the wall 16 and their bearing portions 36 engaging the wall 22. The large diameter portions of the two series are positioned closely adjacent and in lapping relation, as shown in Figure 3, and lie within the chamber 15. The tapered portion 31 of each roller of one series engages the shaft surface 32 and the corresponding portion of each roller of the other series engages the shaft surface 33 axially offset from the surface 32.

By holding each of the rollers against endwise motion in direction of its longer bearing 36, the shaft 5 is held from longitudinal motion. For this purpose the ends of the bearing portion 36 are preferably formed rounded as at 40, those of one series bearing against the annular base 41 of the member 3, and those of the other series bearing against a similar base portion 42 in the cover plate 20. Preferably the opposite bearing ends 35 are out of contact with the adjacent faces 41 and 42 to permit adjustment of the spacing of the base portions 41 and 42 as will appear.

The bearing rollers are held in their proper relative positions as thus described by a cage member 50 shown detached in Figure 2. This cage member comprises a pair of plates 51 and 52, these plates being spaced by the spacing sleeves 53, so as to permit the large diameter portions of the rollers to pass therebetween. Each of these plates 51 and 52 has an outwardly extending circular boss 54 thereon, which is slotted radially to provide bearing seats 55 to take over the bearing portions 35 and 36 of the rollers. Each of these members 51 and 52 is also provided with radially extending ears 56 between which the spacing sleeves 53 are positioned, these ears extending within the recess 51 between its base and the cover plate 20 for free rotation therein. Both the members 51 and 52 are provided with a central opening 57 of ample size to permit the bearing portion of the shaft 5 to pass freely therethrough. This cage, therefore, by reason of its bearing portions 55, holds the several rollers in the two series in annular and spaced relation about the shaft 5, and as alternate rollers are reversed end for end, they are arranged in two series with their large diameter portions rolling against and in axially spaced relation on the shaft 5, bearing on the oppositely tapered faces 32 and 33 of this shaft. As all of these rollers have tapered faces bearing on the shaft, it is evident that by axial adjustment of the rollers relative to the shaft wear both radially and axially of the shaft may be taken up. Movement of the rollers in directions toward their tapered portions of smaller diameter will accomplish this purpose and hence the bearing portions 36 are intended to contact with the corresponding walls of the casing. To provide for such adjustment, it is preferable to employ a shim as at 60 between the cover 20 and the casing part 3, using shims of decreasing thickness as the bearing wears. The wall portions which bear on the roller bearing ends 36 are then brought closer together thus to press the shaft bearing faces of the rollers of the two series further apart. Not only does this adjustment take up wear, but it also prevents axial motion of the shaft 5 when in operation.

As such adjustment is usually sufficiently taken care of by a single bearing when provided with tapered roller and shaft engaging portions a different roller construction may be utilized ordinarily in the opposite bearing as shown in the bearing 4. This bearing may be identical with that described in connection with the bearing 3, except that each of the bearing rollers 70 is provided with a large diameter shaft engaging portion 71 of cylindrical surface, which bears against a corresponding cylindrical surface 72 of the shaft 5. Here also a cage identical with that shown in Figure 2 may be used, the bearing rollers being arranged in two series with their portions of large diameter lapping past each other. Here also a shim as 73 may be placed between the cover member 20 and the portion 7, though the interchange of shims in this case will not act to take up radial wear between the shaft and its bearing.

Any suitable means may be provided for lubricating the bearings, as herein shown a plug 75 being used to close an oil port leading into the chamber 15. Suitable washers of felt or similar material as at 76 may be employed surrounding the shaft 5 to prevent the escape of oil lengthwise thereof.

It will be seen from this construction that the rollers in each bearing are arranged in a pair of circular series about the shaft and that they have a planetary motion, moving about the shaft and rolling on their bearing portions about the annular bearing walls 16 and 22. Preferably the large diameter portions of the rollers are of larger diameter than the mating portions of the shaft or spindle 5. Thus the angular speed of these rollers, even if they were fixed stationary, as in my application hereinbefore mentioned, is less than that of the shaft, but as they rotate in planetary fashion about the shaft their speed of angular motion is further reduced and their bearing portions have rolling rather than rubbing friction.

The cage members being freely rotatable about the shaft act only to hold the rollers in proper spaced relation to each other and therefore are relieved from any considerable amount of bearing pressure. The shaft, therefore, has the highest surface speed of any portion of the mechanism and consequently can be driven at a high speed, and the wear of parts is reduced to such an extent that the life of the bearing is much greater than as heretofore usually constructed, wherein bearing balls, because of their relatively small diameter with respect to the shaft, are compelled to rotate at extremely high velocity,—much greater than that of the shaft itself.

Having thus described an embodiment of this invention, it should be evident to those skilled in the art, that various changes and modifications might be made without departing from its spirit or scope as defined by the appended claims.

I claim:

1. A mechanism of the class described comprising a casing having a pair of spaced internal annular walls, a shaft extending through said casing concentrically with said walls, rollers arranged in a pair of series, each roller having portions of small diameter in rolling engagement with said walls and a portion of large diameter in rolling contact with said shaft, said large diameter portions of the rollers of the two series bearing on said shaft at different positions lengthwise thereof, said large diameter portions and said shaft being complementally bevelled at their engagement, the direction of bevelling being reversed at said different lengthwise positions, and means for holding said rollers against axial movement due to such bevelled engagement.

2. A mechanism of the class described comprising a casing having a pair of spaced internal annular walls, a shaft extending through said casing concentrically with said walls, rollers arranged in a pair of series, each roller having portions of small diameter in rolling engagement with said walls and a portion of large diameter in rolling contact with said shaft, said large diameter portions of the rollers of the two series bearing on said shaft at different positions lengthwise thereof, said large diameter portions and said shaft being complementally bevelled at their engagement, the direction of bevelling being reversed at said different lengthwise positions, and a pair of spaced surface elements, one end of each roller of one series bearing on one of said surface elements and the corresponding end of each roller of the other series bearing on the other surface element.

3. A mechanism of the class described comprising a casing having a pair of spaced internal annular walls, a shaft extending through said casing concentrically with said walls, rollers arranged in a pair of series, each roller having portions of small diameter in rolling engagement with said walls and a portion of large diameter in rolling contact with said shaft, said large diameter portions of the rollers of the two series bearing on said shaft at different positions lengthwise thereof, said large diameter portions and said shaft being complementally bevelled at their engagement, the direction of bevelling being reversed at said different lengthwise positions, a pair of spaced surface elements, one end of each roller of one series bearing on one of said surface elements and the corresponding end of each roller of the other series bearing on the other surface element, and means by which said surface elements may be adjustably spaced.

4. A mechanism of the class described comprising a two-part casing having a pair of spaced internal annular walls, a shaft extending through said casing concentrically with said walls, rollers each having portions of small diameter in rolling contact with said walls and a portion of large diameter in rolling contact with said shaft, a cage for holding said rollers in a pair of series spaced angularly about said shaft, the large diameter portions of the rollers of one series lapping the corresponding portions of the rollers of the other series and bearing on said shaft at a different lengthwise position, said rollers and shaft being complementally bevelled at their engaging portions and in opposite direction for the two series, said casing having surface portions on one of which one end of each roller of one series bears and on the other of which one end of each roller of the other series bears, and a shim positioned between the parts of said casing to space said surface portions adjustable whereby to take up wear.

5. A mechanism of the class described comprising a casing having a pair of spaced internal annular walls, a shaft extending through said casing concentrically with said walls, and a pair of series of rollers, each roller having a portion of large diameter in rolling contact with said shaft and end portions of small diameter of different lengths on opposite sides of said portion of large diameter riding on said walls, the long ends of all the rollers of one series and the short ends of all the rollers of the other series engaging each of said walls, and the portions of larger diameter of one series being offset axially of said shaft relatively to the corresponding portions of the rollers of the other series.

6. A mechanism of the class described comprising a casing having a pair of spaced internal annular walls, a shaft extending through said casing concentrically with said walls, and a pair of series of rollers, each roller having a portion of large diameter in rolling contact with said shaft and end portions of small diameter of different lengths on opposite sides of said portion of large diameter riding on said walls, the long ends of all the rollers of one series and the short ends of all the rollers of the other series engaging each of said walls, and the portions of larger diameter of one series being offset axially of said shaft relatively to the corresponding portions of the rollers of the other series and in lapping relation therewith.

7. A mechanism of the class described comprising a casing having a pair of spaced internal annular walls, a shaft extending through said casing concentrically with said walls, and a pair of series of rollers, each roller having a portion of large diameter in rolling contact with said shaft and end portions of small diameter of different lengths on opposite sides of said portion of large diameter riding on said walls, the long ends of all the rollers of one series and the short ends of all the rollers of the other series engaging each of said walls, and the portions of larger diameter of one series being offset axially of said shaft relatively to the corresponding portions of the rollers of the other series and engaging faces of said large diameter portions and said shaft being complementally beveled in opposite directions for the two series.

In testimony whereof I have affixed my signature.

WILLIAM LE ROY BRYANT.